United States Patent

Shimizu et al.

[11] Patent Number: 5,414,318
[45] Date of Patent: May 9, 1995

[54] BRUSH DEVICE

[75] Inventors: Yutaka Shimizu, Maebashi; Masami Kano, Kiryu, both of Japan

[73] Assignee: Mitsuba Electric Manufacturing Co., Ltd., Japan

[21] Appl. No.: 191,408

[22] Filed: Feb. 3, 1994

[30] Foreign Application Priority Data

Feb. 19, 1993 [JP] Japan .................... 5-011386 U

[51] Int. Cl.6 .................................. H02K 13/00
[52] U.S. Cl. ........................... 310/239; 310/42; 310/68 C; 310/71; 310/89
[58] Field of Search ............ 310/239, 71, 72, 241, 310/242, 245, 247, 89, 91, 68 C, 208, 42, 45; 277/178

[56] References Cited

U.S. PATENT DOCUMENTS

| | | | |
|---|---|---|---|
| 3,159,763 | 12/1964 | Colvill | 310/239 UX |
| 3,283,186 | 11/1966 | Perry | 310/71 |
| 3,450,915 | 6/1969 | Zumsteg | 310/239 |
| 3,527,971 | 9/1970 | Means | 310/239 UX |
| 3,628,075 | 12/1971 | Dafler | 310/239 |
| 4,230,962 | 10/1980 | Carda | 310/239 |
| 4,342,934 | 8/1982 | Van Wijhe | 310/239 |
| 4,356,420 | 10/1982 | Mercuzot | 310/239 |
| 4,673,837 | 6/1987 | Gingerich et al. | 310/239 |
| 4,897,571 | 1/1990 | Isozumi | 310/239 |
| 5,089,735 | 2/1992 | Sawaguchi | 310/71 |
| 5,148,073 | 9/1992 | Tamura | 310/239 |

FOREIGN PATENT DOCUMENTS 0359603  3/1990  European Pat. Off. .
60-176453  of 1985  Japan .

OTHER PUBLICATIONS

Patent Abstracts of Japan—Unexamined Applications, E Field, vol. 10, No. 16 Sep. 10, 1985, The Patent Office Japanese Government, p. 36 E 375 (Providing an Abstract English Language Translation of Japanese Patent Application 60-176453).

*Primary Examiner*—R. Skudy

[57] ABSTRACT

A grommet 40 is coupled to one side of a brush holder stay 20. When the brush holder stay 20 is housed in an end bracket 11, a projection 42 projecting from the grommet 40 is engaged with a groove 14 which is provided in the end bracket 11. A screw insertion hole 25 opened at a position opposite to the grommet 40 of the brush holder stay 20 is adjusted with a threaded hole 16 of a boss portion formed in the end bracket 11, whereby a screw 34 is inserted therethrough and screwed in the threaded hole 16. The brush holder stay 20 is fixed to the end bracket 11 by one piece of screw 34 and the grommet 40.

11 Claims, 4 Drawing Sheets

BRUSH DEVICE

BACKGROUND OF THE INVENTION

1. Field of the Invention

This invention relates to a brush device, and more particularly to improvements in fixing construction of a brush holder stay, which is effective, for example, in use for a driving motor in a wiper driving system.

2. Related Art Statement

As a conventional driving motor for a wiper driving system, there has been a driving motor wherein a brush device is provided on the side of an end bracket which constitutes a part of a motor housing, and the brush device comprises: a brush holder stay disposed around a commutator and fixed to the end bracket; at least a pair of brush holders radially disposed on and fixed to the stay toward the center of the commutator; brushes slidably housed in the brush holders respectively, said brushes being in sliding contact with the commutator under biasing forces of brush springs; and a grommet with lead wires being inserted therethrough, said wires supplying electricity to the brushes.

In the above-described conventional brush device, such a construction is generally adopted, as a fixing construction of the brush holder stay to the end bracket, that a pair of threaded holes are formed in the end bracket at a phase difference of 180°, a pair of screw insertion holes are opened in the brush holder stay at a phase difference of 180°, and two screws are inserted through the screw insertion holes and screwed into the threaded holes respectively, so that the brush holder stay can be fixed to the motor housing.

However, in the fixing construction of the brush holder stay to the end bracket by two screws, it is difficult to simultaneously adjust the respective positions of the two screw insertion holes of the brush holder stay and the threaded holes of the end bracket. Further, it is difficult to insert two screws through both of the screw insertion holes and then screw them into both of the threaded holes respectively, thereby the workability of assembling work may be lowered.

SUMMARY OF THE INVENTION

It is an object of the present invention to provide a brush device which can improve the workability in assembling the brush holder stay to a motor housing.

The brush device according to the present invention is constructed to comprise: a brush holder stay disposed around a commutator in a motor housing, said stay being constructed to be fixed to said motor housing by a single screw; a grommet for inserting lead wires therethrough, said grommet being coupled to said brush holder stay; a recessed portion for coupling said grommet being formed on one side of said brush holder stay; a screw insertion hole opened on the other side substantially opposed to said recessed portion centering around a rotary shaft of a motor; a grommet insertion hole formed on one side of said housing, said hole being accompanied with a groove for engaging a projection; a threaded hole formed on the other side substantially opposed to said grommet insertion hole centering around said rotary shaft, wherein said single screw is screwed into said threaded hole through said screw insertion hole, so that said brush holder stay is fixed to said housing.

According to the above-described means, the brush holder stay is fixed to the motor housing by one screw, so that positioning adjustment between the screw insertion hole and the threaded hole can be easily performed, and further, a screwing work in assembling can be facilitated. That is, because the positioning work and the screwing work are required only at one point, it is not necessary to adjust a plurality of positions at the same time as in the case of multi-point positioning, so that the workability can be improved multiplicatively. Accordingly, the assembling work of the brush holder stay to the motor housing can be facilitated.

DETAILED DESCRIPTION OF THE PREFERRED EMBODIMENTS

In this embodiment, a brush device according to the present invention is constructed to be used in a driving motor for a wiper driving system. The brush device is assembled into an end bracket 11 which constitutes a part of a housing of the driving motor (not shown). The end bracket 11 is constructed to block the opening side of a yoke (not shown) which is formed in a substantially cylindrical shape.

Figure 2A:
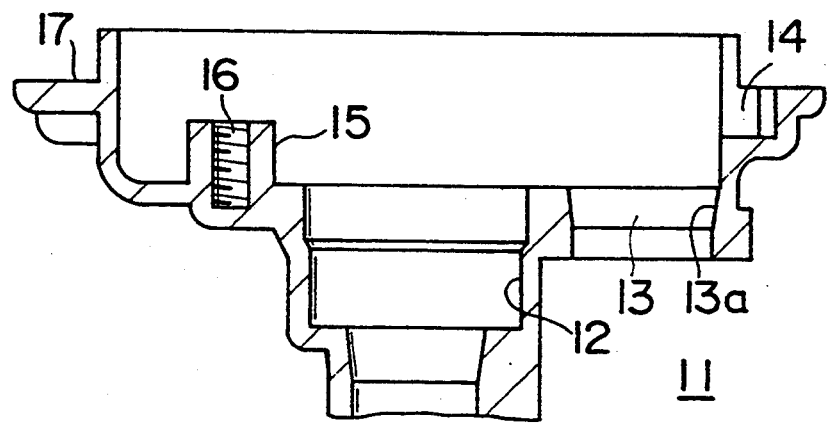
FIGS. 2(a) and 2(b) are drawings showing an end bracket, FIG. 2(a) being a longitudinal sectional view of the center of a planar view, and FIG. 2(b) being the planar view.
Figure 2B:
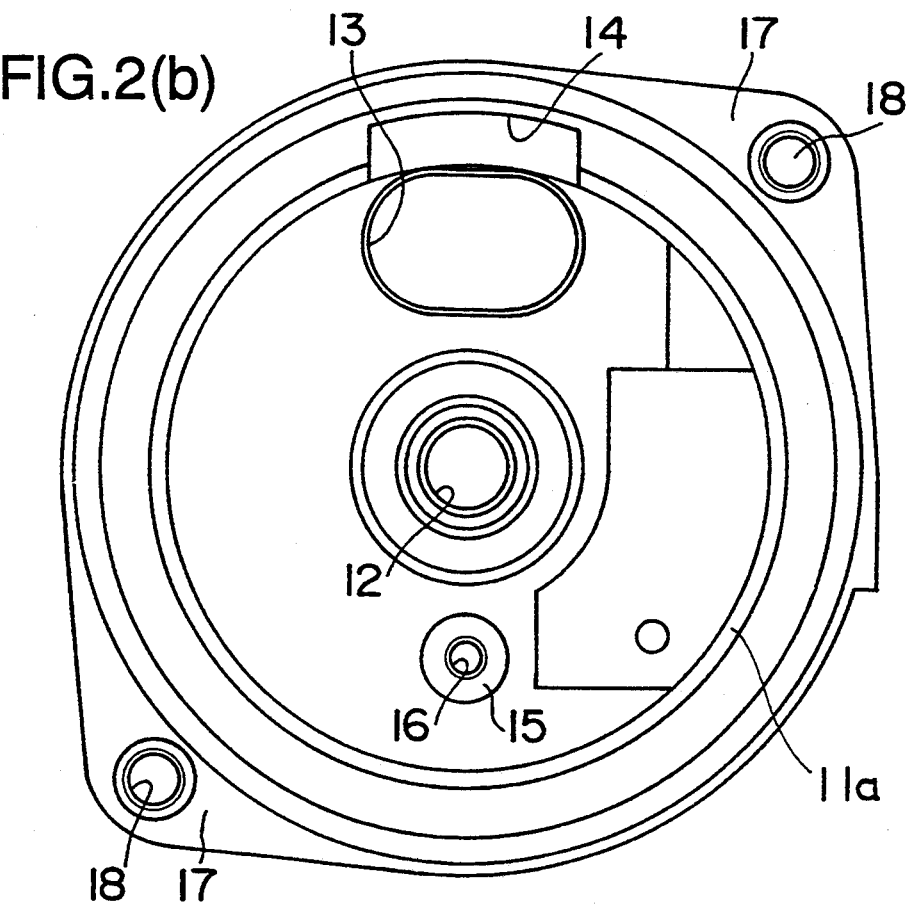

The end bracket 11 is formed in a circular dish shape as shown in FIG. 2(a) and FIG. 2(b). A rotor shaft insertion hole 12 is opened in circular shape at a central portion of a bottom wall of the end bracket 11, being concentric with the end bracket 11. A grommet insertion hole 13 is formed in an oval shape in the end bracket 11, locating at one side (hereinafter referred to as "rear side") in an outer peripheral edge portion of the bottom wall of the end bracket 11. A tapered portion 13a for facilitating the insertion of a grommet, which will be described hereunder, is formed in the inlet side of the grommet insertion hole 13. A groove 14 for engaging a projection is formed in the vicinity of the grommet insertion hole 13 on the bottom wall of the end bracket 11, having a circularly arcuate shape with a preset depth and a preset width and extending in a radially outward direction of the end bracket Furthermore, a boss portion 15 is formed in a columnar shape on the front side of the bottom wall of the end bracket 11 and in the vicinity of the rotor shaft insertion hole 12. A threaded hole 16 is formed in the boss portion 15 being a substantially concentric circle with the boss portion 15. An end surface (hereinafter referred to as "top surface") on the opening side of the boss portion 15 is formed to be able to support a brush holder stay (to be described hereunder) in horizontal when the stay is mounted thereon.

In order to connect the end bracket 11 to the yoke, a pair of flange portions 17 and 17 are radially outwardly formed in a side surface portion of the end bracket 11, having a plate shape in a substantially equilateral triangle. Mounting holes 18 and 18 for fastening are respectively opened in the flange portions 17 and 17.

A brush holder stay 20 is mounted inside of the end bracket 11 which is formed generally in a short cylindrical shape. The brush holder stay 20 is made of an insulating material such as Bakelite, and integrally formed in a generally circular planar plate shape as shown FIG. 3(b), which has a diameter smaller than a cylindrical hollow portion of the end bracket 11 to be mounted thereinto. A commutator insertion hole 21 is opened in a central portion of the brush holder stay 20, and has a circular shape being concentric with the circular shape of the brush stay 20.

A recessed portion 22 for coupling the grommet therewith is formed in a substantially U-letter shape, locating in the rear side of an outer peripheral portion of the brush holder stay 20. A circuit breaker mounting hole 28 is formed in the brush holder stay 20 at a position adjacent to the recessed portion 22, being cut in a substantially rectangular shape in a radially inward direction of the stay 20. A plurality of grooves 24 for wiring lead wires are radially inwardly opened in the outer peripheral portion of the brush holder stay 20. The respective grooves 24 are provided with some spaces to each other in a circumferential direction of the stay 20.

A screw insertion hole 25 is opened in a circular shape in the brush holder stay 20 at a position substantially opposed to the recessed portion 22 centering around the commutator insertion hole 21. The screw insertion hole 25 is provided to correspond to the position of the threaded hole 16 of the end bracket 11. Three pairs of brush holder mounting holes 26 are respectively opened in rectangular shapes and disposed radially at predetermined positions. Every pair of the mounting holes 26 is formed to be opposed to each other.

Figure 3A:
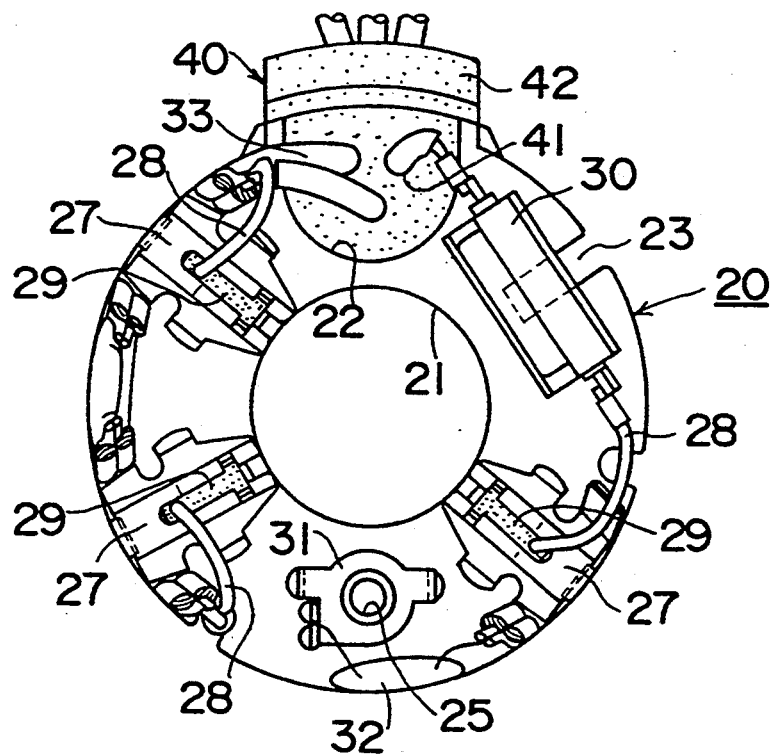
FIGS. 3(a) and 3(b) are drawings showing the brush holder stay, FIG. 3(a) being a planar view showing the state where electric parts are mounted thereonto, and FIG. 3(b) being a planar view showing the brush holder stay only.
Figure 3B:
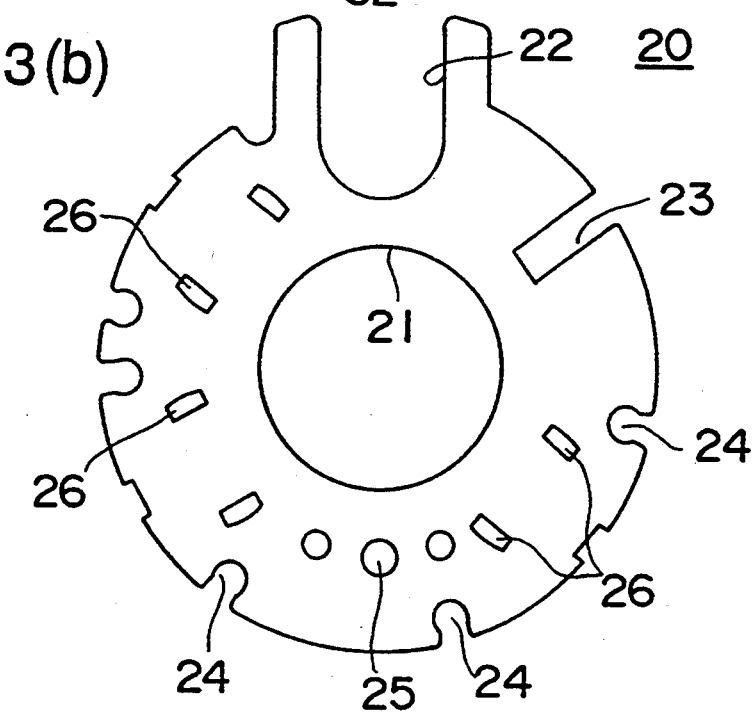

As shown in FIG. 3(a), the respective three brush holders 27 are disposed radially around the commutator insertion hole 21 on the brush holder stay 20, and fixed to the stay 20 by caulking at the respective mounting holes 26. Brushes 29, each having a pig tail 28 therewith, are slidably housed in the respective brush holders 27 so as to be in sliding contact with an outer peripheral surface of the commutator under the biasing forces of brush springs (not shown).

A circuit breaker 30 is mounted on the brush holder stay 20, being coupled into the circuit breaker mounting hole 23 in a direction tangent to the commutator insertion hole 21. An earth plate 31 is fixed to the brush holder stay 20 at the screw insertion hole 25 by caulking eyelets of the stay 20. As shown in FIG. 3(a), in this embodiment, three brush holders 27, the circuit breaker 30, the grommet 40 and the screw insertion hole 25 are respectively disposed on the brush holder stay 20 at positions dividing the stay 20 into substantially equal six parts in a circumferential direction. Incidentally, designated by reference numeral 32 is a condenser, 33 is a lead wire and 34 is a screw.

Figure 1A:
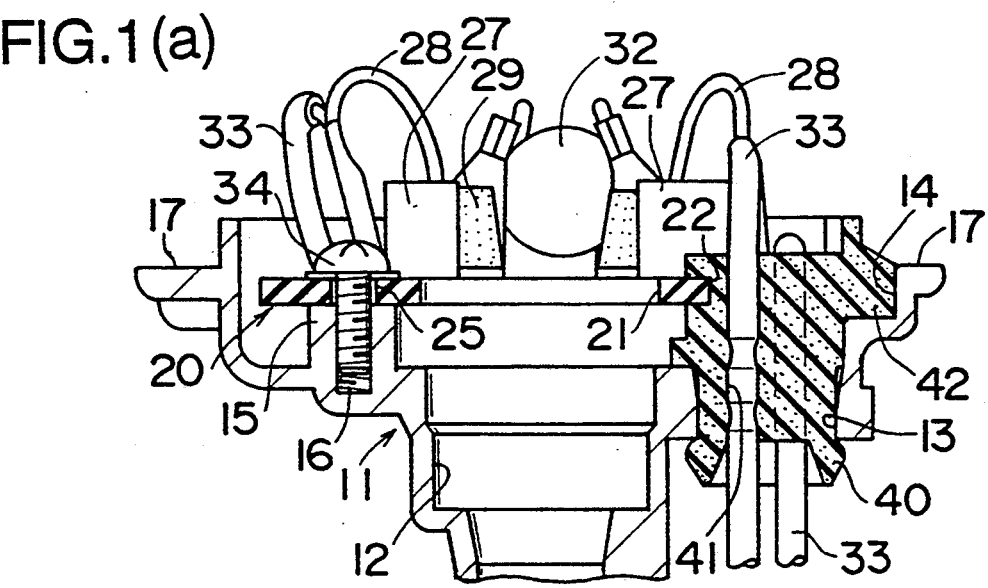
FIGS. 1(a) and 1(b) are drawings showing a brush device embodying the present invention, FIG. 1(a) being a longitudinal sectional view through the center of a planar view, and FIG. 1(b) being the planar view.
Figure 1B:
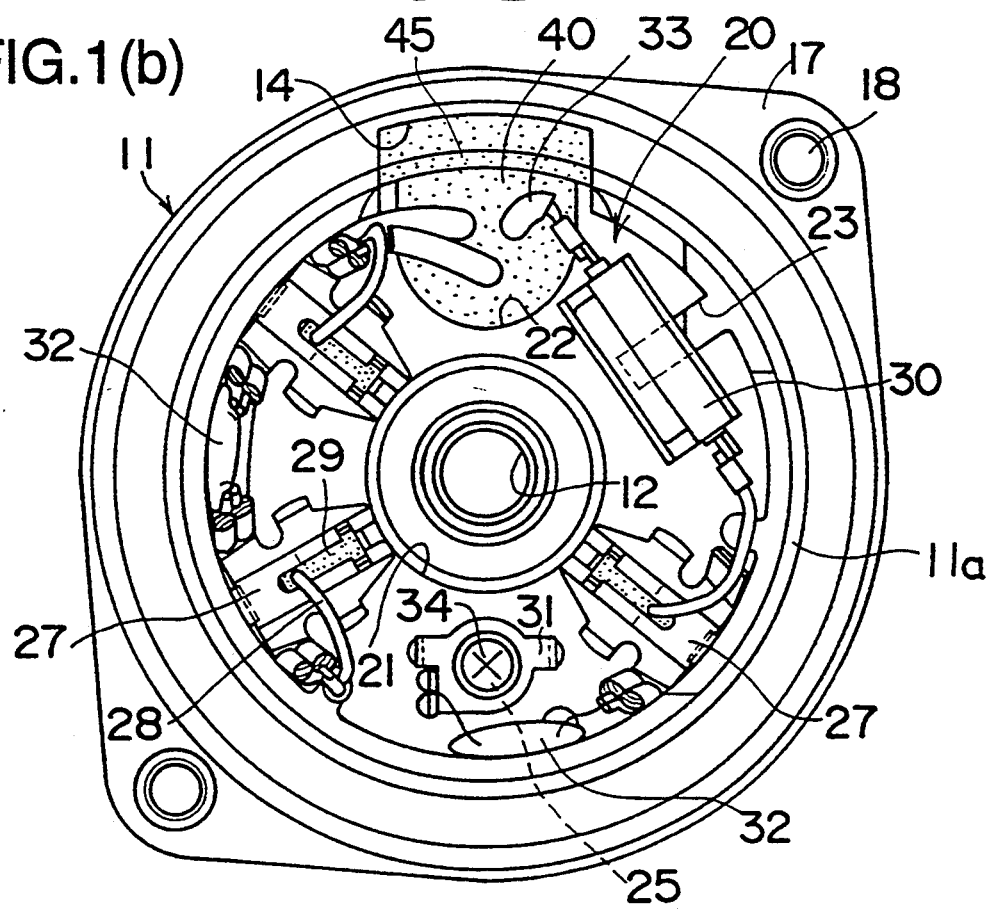

In this embodiment, as shown in FIG. 1(a) and FIG. 1(b), the grommet 40 is coupled to the recessed portion 22 of the brush holder stay 20, and three lead wires 33 are inserted through three lead wire insertion holes 41 of the grommet 40, and then the lead wires 33 connect to the circuit breaker 30 and the pig tails 28 respectively.

Figure 4A:
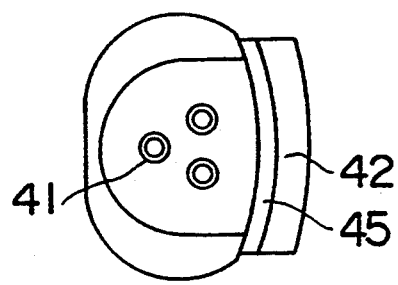
FIGS. 4(a) to 4(e) are drawings showing a grommet, FIG. 4(a) being a planar view, FIG. 4(b) a side view, FIG. 4(c) a bottom view, FIG. 4(d) a front view and FIG. 4(e) a longitudinal sectional view.
Figure 4B:
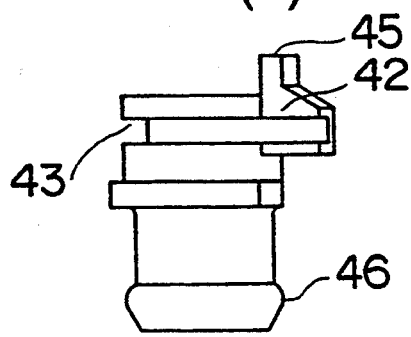
Figure 4D:
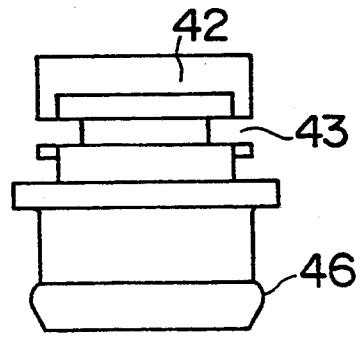
Figure 4C:
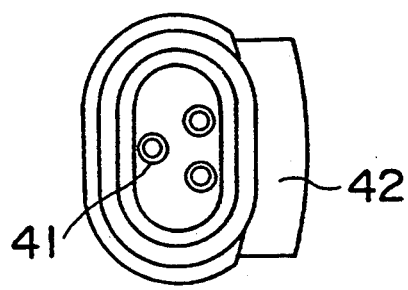

The grommet 40 is made of an elastic material such as rubber or resin and integrally formed in a substantially oval columnar shape as shown in FIG. 4(a). A projection 42 is formed at one end portion of the grommet 40, having a substantially rectangular form curved in a circularly arcuate shape. The projection 42 is engageable with the groove 14 of the end bracket 11. As shown in FIG. 4(b) and FIG. 4(d), a coupling groove 43 is formed in a substantially annular shape on an outer periphery of the grommet 40 at a position opposite to the projection 42, which is to be coupled with an edge of the recessed portion 22 of the brush holder stay 20.

Figure 4E:
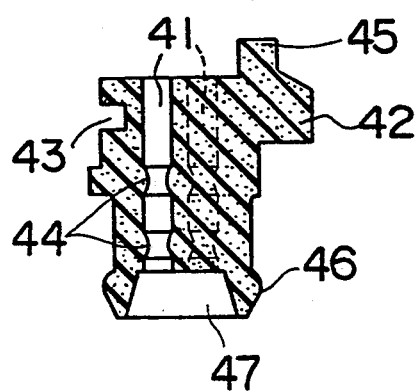

Two annular ridges 44 are formed in the inner portion of the respective lead wire insertion holes 41 of the grommet 40 as shown in FIG. 4(e) in order to prevent the lead wires from falling off and to obtain sealing property.

An arcuate rib 45 is formed at one end of the grommet 40 where the projection 42 is formed as shown in FIG. 4(a) and FIG. 4(e). The rib 45 projects in an axial direction of the grommet 40, and constitutes a part of a circular rib 11a being formed on the end bracket 11 and projecting in an axial direction of the end bracket 11. The circular rib 11a functions as a seal when the brush device is fully assembled.

As shown in FIG. 4(e), at one end portion in the axial direction of the grommet 40 in this embodiment, there are provided: an annular ridge 46 radially projecting from the outer periphery of the grommet 40, for preventing the fall-off of the grommet 40 from the insertion hole 13; and a recessed portion 47 formed in the axial direction of the same end portion of the grommet 40 and inside of the ridge 46, for permitting decrease a diameter of the ridge 46 in the radially inward direction of tile grommet 40 when the grommet 40 is pressedly inserted into the insertion hole 13. When the insertion of the grommet 40 into the hole 13 is fully made, the diameter of the ridge 46 is recovered in normal state, and then the ridge 46 functions as a stopper.

The assembling work of the brush device will be described hereunder.

The brush holder stay 20 with the brush holders 27 and the like fixed thereto is inserted into the end bracket 11. At this time, the respective lead wires 33 have been pulled out to the brush holder 27 side on the brush holder stay 20, and the respective brushes 29, the pig tails 28 of which are connected to the forward end portions of the respective lead wires 33, are pressed into the respective brush holders 27 against the biasing forces of the brush springs which are provided in the interior of the brush holders 27 respectively, and then, the respective brushes 29 are engaged with cutaway portions in the brush holders 27 and temporarily fixed thereto.

In the assembling work of the brush holder stay 20 into the end bracket 11, a forward end of the grommet 40, which has been coupled to the recessed portion 22 of the brush holder stay 20, is inserted into the grommet insertion hole 13 of the end bracket 11, thereby the grommet 40 is fixed to the end bracket 11. At this time, the projection 42 of the grommet 40 is engaged with the groove 14 formed in the end bracket 11.

Further, a positioning work is made between the screw insertion hole 25 of the brush holder stay 20 and the treaded hole 16 of the end bracket 11. Subsequently, a screw 34 is inserted through the screw insertion hole 25, and the screw 34 thus inserted is screwed into the threaded hole 16. By this fastening work, the brush holder stay 20 is fixed to the end bracket 11.

In this case, a positioning adjustment in the opposite position to the screw insertion hole 28 and the threaded hole 16 have been already made due to the connection between the projection 42 of the grommet 40 and the engaging groove 14 of the end bracket 11. Therefore, it is required to secure only the positioning between the screw insertion hole 25 and the threaded hole 16, thereby, the positioning work and the subsequent screwing work as a whole can be very easily performed in this embodiment.

Further, upon completion of the assembling work of the brush holder stay 20 to the end bracket 11, a rotor shaft (not shown), to which an armature and a commutator are fixed, is inserted in succession into both of the commutator insertion hole 21 of the brush holder stay 20 and the rotor shaft insertion hole 12 of the end bracket 11.

Subsequently, the rotor shaft is covered by a yoke (not shown), and the yoke and the end bracket 11 are fastened to each other at the flange portions 17. In this fastened state, the projection 42 of the grommet 40 is brought into being clamped by both of the end bracket 11 and the yoke, so that lifting of the grommet 40 from the end bracket 11 can be prevented. Then, the brush holder stay 20 is brought into being held by the grommet 40 and the screw 34, so that the brush holder stay 20 can be reliably fixed to the end bracket 11.

In this embodiment, the grommet insertion hole 13 is formed having a shape and a size to permit the grommet 40 to pass therethrough, so that insertion and positioning works of the grommet 40 thereinto can be facilitated.

Furthermore, the grommet insertion hole 13 has at the inlet side thereof a tapered portion 13a in a direction that the grommet 40 is inserted thereinto, so that insertion of the grommet 40 can be further facilitated.

Further, the grommet insertion hole 13 is formed in an oval shape, so that there is such an advantage that, when the screw 34 is inserted thereinto, the brush holder stay 20 is guided onto the grommet insertion hole 13, whereby the grommet insertion hole 13 can be easily found and the brush holder stay 20 is properly positioned relative to the end bracket 11.

As has been described hereinabove, according to the present invention, the brush holder stay can be fixed to the motor housing by the grommet and a single screw, so that the assembling workability of the brush device can be improved.

Incidentally, the present invention should not be limited to the above embodiment, and other various modifications can be made.

What is claimed is:

1. A brush device for an electric motor, said brush device comprising:
   a motor housing part,
   a brush holder stay disposed in said motor housing part for mounting thereon brush holders, said stay being constructed to be fixed to said motor housing part by a single screw and having a commutator insertion hole;
   a grommet for inserting lead wires therethrough, said grommet being coupled to said brush holder stay;
   a recessed portion formed in said brush holder stay radially outwardly of said commutator insertion hole for coupling with said grommet;
   a screw insertion hole opened in said brush holder stay radially outwardly of said commutator insertion hole and substantially on the opposite side of said commutator insertion hole from said recessed portion;
   a grommet insertion hole formed in said housing part adjacent said recessed portion of said brush holder stay and couplingly receiving a portion of said grommet; and
   a threaded hole formed in said housing part adjacent said screw hole of said brush holder stay,
   said single screw being screwed into said threaded hole through said screw insertion hole, so that said brush holder stay is fixed thereby to said housing part.

2. A brush device as set forth in claim 1, wherein a coupling groove is formed at one end on a side wall of the grommet, and the grommet is secured to the recessed portion of the brush holder stay by coupling said groove to the recessed portion.

3. A brush devise as set forth in claim 2, wherein a projection is formed in the grommet at a position opposite to the coupling groove, and a groove is formed in the housing part adjacent said grommet insertion hole, said projection of said grommet being engaged with the groove in the housing.

4. A brush device as set forth in claim 1, wherein a plurality of lead wire insertion holes are provided in and pass through the grommet, each of said wire insertion holes along its length having at least one annular ridge for gripping a wire inserted therein to form a seal between the grommet and such wire and to hold such wire in place relative to the grommet.

5. A brush device as set forth in claim 1, wherein a rib projecting in an axial direction of the grommet is provided on the grommet at one end thereof near a projection, and said rib constitutes a part of a rib of an end bracket projecting in an axial direction of said end bracket, said end bracket constituting said housing part.

6. A brush device as set forth in claim 1, wherein at one end portion of the grommet in an axial direction, there are provided: an annular ridge radially projecting from an outer periphery of the grommet for preventing the grommet from falling off of said motor housing part; and a recessed portion formed in the same end portion of the grommet in the axial direction at the inside of said ridge, said recessed portion permitting decrease of a diameter of said ridge in a radially inward direction of the grommet when the grommet is inserted into the grommet insertion hole.

7. A brush device as set forth in claim 1, wherein the grommet insertion hole is formed in a shape and a size to permit the grommet to pass therethrough.

8. A brush device as set forth in claim 7, wherein the grommet insertion hole has at an inlet side thereof a tapered portion being tapered in a direction of inserting the grommet thereinto.

9. A brush device as set forth in claim 7, wherein the grommet insertion hole is formed in an oval shape.

10. A brush device as set forth in claim 1, wherein said housing part is an end bracket, a plurality of brush holders and at least one circuit breaker are carried by said brush holder stay and the screw insertion hole of said brush holder stay is disposed in a region of said brush holder other than the regions thereof occupied by said plurality of brush holders and said at least one circuit breaker.

11. A brush device as set forth in claim 1, wherein the device further comprises a circuit breaker, and three brush holders, the circuit breaker, the grommet and the screw insertion hole are respectively disposed on the brush holder stay at positions dividing the stay into substantially equal six parts in a circumferential direction.

* * * * *